(12) United States Patent
Ardisana, II et al.

(10) Patent No.: US 9,778,690 B2
(45) Date of Patent: Oct. 3, 2017

(54) ADAPTIVE DOCKING STATION

(71) Applicant: APPLE INC., Cupertino, CA (US)

(72) Inventors: John B. Ardisana, II, San Francisco, CA (US); Edward Siahaan, San Francisco, CA (US); Albert J. Golko, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 14/502,594

(22) Filed: Sep. 30, 2014

(65) Prior Publication Data

US 2016/0091925 A1    Mar. 31, 2016

(51) Int. Cl.
*G06F 1/16*    (2006.01)

(52) U.S. Cl.
CPC .......... *G06F 1/1632* (2013.01); *G06F 1/1626* (2013.01)

(58) Field of Classification Search
CPC ............................. G06F 1/1632; G06F 1/1626
See application file for complete search history.

(56) References Cited

U.S. PATENT DOCUMENTS

| | | | |
|---|---|---|---|
| 3,605,069 A | 9/1971 | Dorrell | |
| 5,875,094 A | 2/1999 | Kirkendoll | |
| 5,959,835 A * | 9/1999 | Dohi | G06F 1/1632 361/679.41 |
| 6,115,247 A | 9/2000 | Helot | |
| 6,216,195 B1 * | 4/2001 | Lee | G06F 1/1632 361/679.41 |
| 6,301,106 B1 | 10/2001 | Helot et al. | |
| 6,560,097 B2 | 5/2003 | Naruo et al. | |
| 6,752,632 B1 | 6/2004 | Anderson et al. | |
| 7,014,486 B1 * | 3/2006 | Wu | G06F 1/1632 439/165 |
| 7,066,752 B2 | 6/2006 | Hsu et al. | |
| 7,119,830 B2 | 10/2006 | Saito et al. | |
| 7,142,421 B2 | 11/2006 | Cheng et al. | |
| 7,386,868 B2 | 6/2008 | McCormack | |
| 7,643,283 B2 | 1/2010 | Jubelirer et al. | |
| 7,675,746 B2 | 3/2010 | Crooijmans et al. | |
| 7,683,573 B2 | 3/2010 | Nikazm et al. | |
| 7,719,830 B2 | 5/2010 | Howarth et al. | |
| 7,840,740 B2 | 11/2010 | Minoo | |

(Continued)

FOREIGN PATENT DOCUMENTS

EP    2706429 A2    3/2014

OTHER PUBLICATIONS

Ardisana et al., U.S. Appl. No. 14/659,176, filed Mar. 16, 2015.
International Search Report and Written Opinion for PCT/US2015/040641, dated Oct. 12, 2015, 14 pages.

*Primary Examiner* — David M Sinclair
*Assistant Examiner* — Theron S Milliser
(74) *Attorney, Agent, or Firm* — Kilpatrick Townsend and Stockton, LLP (57) ABSTRACT

An aesthetically pleasing docking station that is able to accommodate electronic devices with and without cases. An actuator within the docking station allows the connector plug of the docking station to retract a variable amount such that little or no gap exists between the electronic device and the surface of the docking station. Other embodiments enable the top surface of the housing to translate vertically such that little or no gap exists between the electronic device and surface of the docking station.

14 Claims, 5 Drawing Sheets

(56) References Cited

U.S. PATENT DOCUMENTS

| | | | |
|---|---|---|---|
| 7,857,541 B2* | 12/2010 | Gong | A61B 8/00 361/679.58 |
| 7,869,195 B1 | 1/2011 | Patton | |
| 8,007,309 B2 | 8/2011 | Fan | |
| 8,535,102 B1 | 9/2013 | Colahan et al. | |
| 8,721,356 B2* | 5/2014 | Webb | G06F 1/1632 439/248 |
| 8,792,233 B2 | 7/2014 | Terlizzi | |
| 8,986,029 B2 | 3/2015 | Webb et al. | |
| 9,054,478 B2 | 6/2015 | Golko et al. | |
| 9,103,484 B2 | 8/2015 | Hayashi et al. | |
| 9,178,299 B2* | 11/2015 | Alexia | H01R 13/44 |
| 9,201,453 B2* | 12/2015 | Stanley | G06F 1/1626 |
| 9,466,927 B2 | 10/2016 | Ardisana, II et al. | |
| 2001/0026437 A1 | 10/2001 | Naruo et al. | |
| 2004/0145864 A1* | 7/2004 | Usui | G06F 1/1632 361/679.41 |
| 2004/0229494 A1* | 11/2004 | Hsu | H01R 13/62905 439/374 |
| 2007/0069088 A1 | 3/2007 | Bidiville et al. | |
| 2007/0127205 A1 | 6/2007 | Kuo | |
| 2008/0239658 A1* | 10/2008 | Chou | G06F 1/1632 361/679.38 |
| 2009/0009957 A1 | 1/2009 | Crooijmans et al. | |
| 2011/0095724 A1 | 4/2011 | Byrne | |
| 2011/0164375 A1* | 7/2011 | Hayashida | G06F 1/1632 361/679.41 |
| 2012/0264329 A1* | 10/2012 | Hayashida | G06F 1/1632 439/529 |
| 2013/0163186 A1* | 6/2013 | Mizusawa | H05K 7/14 361/679.41 |
| 2014/0069710 A1* | 3/2014 | Webb | H05K 7/14 174/549 |
| 2014/0242848 A1 | 8/2014 | Golko et al. | |
| 2014/0293530 A1 | 10/2014 | Terlizzi | |
| 2016/0363958 A1 | 12/2016 | Ardisana, II et al. | |

* cited by examiner

ADAPTIVE DOCKING STATION

FIELD

The present invention relates generally to docking stations for portable electronic devices and in particular to docking stations for electronic devices that are aesthetically pleasing and can accommodate protective outer cases on the electronic device.

BACKGROUND

Currently there are a wide variety of known electronic device docks that include a connector for electrically connecting to the electronic device. The connection between the dock and the electronic device may be established to provide power, to transfer data or other information, or for any other suitable reason. Consumers may equip their electronic devices with an outer protective case to protect them from damage. Myriad cases are available having a large range of dimensions and thicknesses. Some relatively thick cases may require the connector within the dock to extend a large distance from the dock to enable the electronic device to fully mate with the connector. If the dock is designed with such a connector, the use of a relatively thin case or no case at all may result in an unsightly gap between the electronic device and the docking station.

New docking stations may require new features to accommodate electronic devices with and without protective cases while providing an aesthetically pleasing appearance.

SUMMARY

Embodiments of the invention pertain to docking stations for electronic devices. In some embodiments the docking station may be configured to provide an aesthetically pleasing appearance while accommodating electronic devices with and without protective cases.

Some embodiments of the present invention relate to a docking station having a housing with an exterior surface and a connector plug protruding from the exterior surface. The connector plug may be configured to retract within the housing after a mating event such that a protrusion length of the plug after the mating event is less than a protrusion length before the mating event. Further embodiments may employ an actuator disposed within the housing and coupled to the connector plug. The actuator may be configured to retain the connector plug in a first position before a mating event and allow the connector plug to move to a second position after a mating event to minimize the gap between the electronic device and the docking station.

Some embodiments relate to a docking station having an outer housing encompassing an inner base. The outer housing may be configured to vertically and/or horizontally translate relative to the inner base. A connector plug may be secured to the inner base and protrude through an aperture in the outer housing such that a mating event of the portable electronic device to the connector plug causes the outer housing to vertically translate towards the inner base such that a protrusion length of the connector plug from the outer housing after the mating event is greater than a protrusion length before the mating event.

Further embodiments relate to docking stations having temporary latch mechanisms configured to secure the outer housing in a vertical position relative to the inner base after a mating event. In some embodiments the temporary latch mechanism may be released by a magnet placed proximate the outer housing, by pushing the outer housing towards the inner base or by pushing a button or other actuator on the docking station.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Certain embodiments of the present invention relate to docking stations for electronic devices. While the present invention can be useful for a wide variety of docking stations, some embodiments of the invention are particularly useful for docking stations that can be used with electronic devices that may employ protective cases, as described in more detail below.

Figure 1:
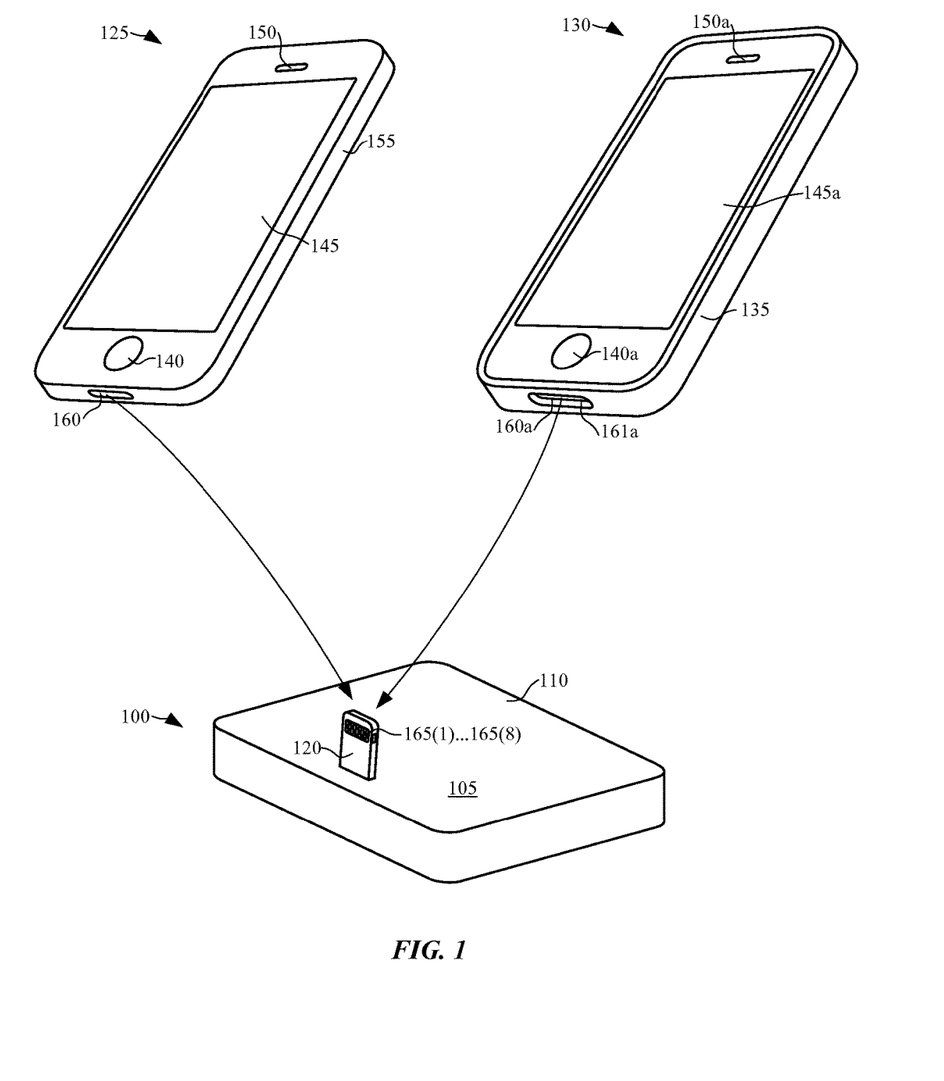
FIG. 1 is a front perspective view of electronic devices with and without covers along with a docking station according to an embodiment of the invention.

FIG. 1 depicts an illustrative rendering of one particular docking station 100 that may accommodate electronic devices with and without protective cases while providing an aesthetically pleasing appearance. Docking station 100 may also accommodate electronic devices with different case configurations and thicknesses, as will be discussed in more detail below.

Docking station 100 has a housing 105 with an exterior surface 110 and a plug connector 120 protruding from the exterior surface and configured to mate with an electronic device. FIG. 1 illustrates two electronic devices 125, 130 that are configured to mate with docking station 100. The primary difference between electronic devices 125, 130 is that electronic device 125 has no case and electronic device 130 has a case 135. Case 135 may have one or more openings so features of electronic device 130 may be accessed, as discussed in more detail below. Electronic device 125 includes a multipurpose button 140 as an input component, a touch screen display 145 as both an input and output component, and a speaker 150 as an output component, all of which are housed within device housing 155. Device 125 also includes a receptacle connector 160 within device housing 155. Receptacle connector 160 can be positioned within device housing 155 and configured to mate with corresponding plug connector 120 of docking station 100.

Electronic device 130 with case 135 is configured similar to electronic device 125, with a multipurpose button 140a, touch screen display 145a, speaker 150a and receptacle connector 160a, however electronic device 130 additionally has protective case 135 surrounding a substantial portion of the exterior of the device. Protective case 135 is for illustrative purposes only and myriad protective cases, including cases of different thicknesses, may be used without departing from the invention. Case 135 may have an opening 161a so receptacle connector 160a may be accessed for communication and/or charging. Case 135 may be removable and may be made from plastic and/or elastomeric materials.

For simplicity, various internal components, such as the control circuitry, graphics circuitry, bus, memory, storage device and other components of electronic devices 125, 130 and docking station 100 are not shown in FIG. 1. Embodiments of the invention disclosed herein are particularly suitable for use with docking stations that are configured to be aesthetically pleasing (e.g., no gap between the electronic device and the docking station) when mated to electronic devices with or without cases. Additionally, in some embodiments, the docking station may provide improved usability of the electronic device by positioning it at an angle when docked for improved viewing and user access.

In order to better appreciate the features and aspects of docking stations according to the present invention, further context for the invention is provided in the following section by discussing one particular implementation of a docking station according to one embodiment of the present invention.

Figure 2:
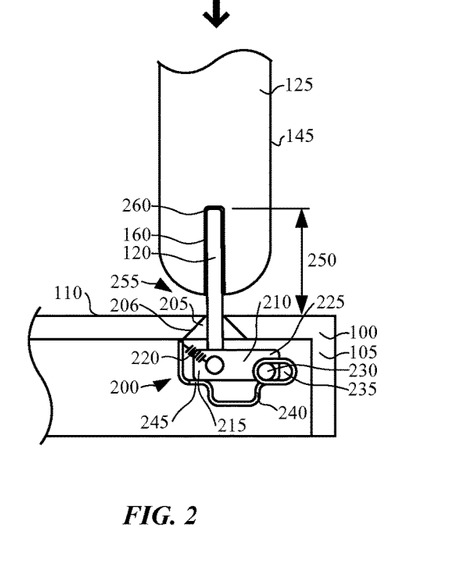
FIG. 2 is a partial cross-sectional view of an embodiment of a docking station with an electronic device being mated to it.

Now referring to FIG. 2, a simplified partial cross-sectional view of receptacle connector 160 of electronic device 125 being mated to plug connector 120 of docking station 100 is illustrated. A gap 255 between electronic device 125 and exterior surface 110 of docking station 100 may result and be aesthetically undesirable. In addition, electronic device 125 is oriented approximately perpendicular to docking station 100 which may make display 145 more difficult to see and make the device more difficult for the user to interact with. Docking station 100 is configured to eliminate or minimize gap 255 improving the aesthetic appearance, and in some embodiments may also tilt electronic device 125 rearward to improve the viewing angle for the user improving their ability to interact with the device.

Exterior surface 110 of docking station has an aperture 205 through which plug connector 120 protrudes to mate with electronic device 125. Plug connector 120 is secured to an actuator 200 that enables docking station 100 to eliminate gap 255 and tilt electronic device 125. Actuator 200 comprises a linkage 210 having a first end 215 coupled to tension spring 220 and a second end 225 having a pivot 230. In some embodiments pivot 230 can both rotate and translate in slot 235 of track 240. First end 215 of linkage 210 is supported by ledge 245 of track 240 so that electronic device 125 can be mated with plug connector 120. In the state illustrated in FIG. 2, plug connector 120 has a first protrusion length 250 and is oriented approximately perpendicular to exterior surface 110 of housing 105. Protrusion length 250 may be determined by measuring from a distal end 260 of plug connector 120 to exterior surface 110.

Figure 3:
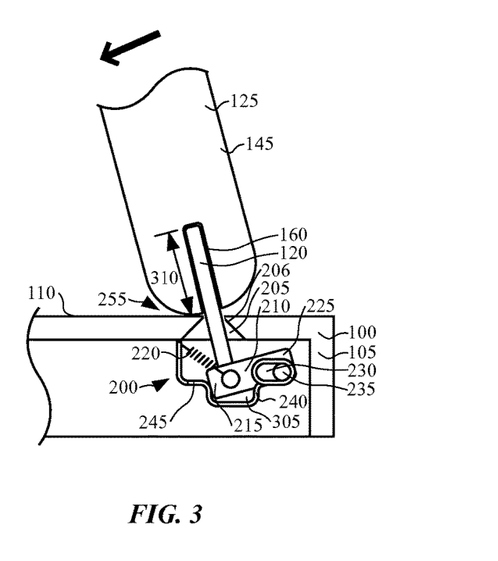
FIG. 3 is a partial cross-sectional view of the docking station shown in FIG. 2 after the electronic device is mated and released by the user.

Now referring to FIG. 3, a simplified partial cross-sectional view of electronic device 125 after being mated to docking station 100 and released by the user is illustrated. The weight of electronic device 125 has overcome the force in tension spring 220 allowing linkage 210 to translate to the right and rotate about pivot 230. In other embodiments a user may push down on electronic device 125. Further, first end 215 of linkage 210 has traveled downward along track 240 into well 305 until the bottom of electronic device 125 rests against exterior surface 110 of housing 105. Thus, the bottom surface of electronic device 125 acts as a travel stop so gap 255 between electronic device 125 and dock 100 may be reduced or completely eliminated, resulting in improved aesthetics. Plug connector 120 has retracted within housing 105 such that plug connector 120 protrudes a second protrusion length 310 from exterior surface 110 of housing 105. As illustrated, second protrusion length 310 (see FIG. 3) is less than first protrusion length 250 (see FIG. 2). Further, in some embodiments, electronic device 125 may be tilted relative to exterior surface 110 of housing 105 making display 145 more readable and accessible.

Figure 4:
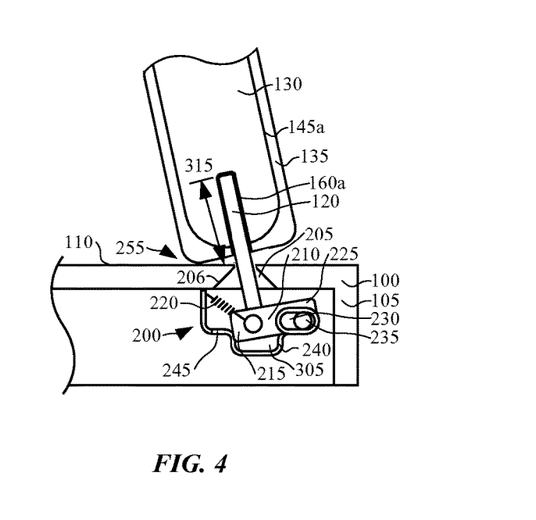
FIG. 4 is a partial cross-sectional view the docking station shown in FIGS. 2-3 with an electronic device having a cover, mated to the docking station and released by the user.

Now referring to FIG. 4, an electronic device 130 with outer case 135 is mated to docking station 100. This illustration demonstrates how docking station 100 accommodates both electronic devices without cases as well as those with cases. FIG. 4 is identical to FIG. 3, except electronic device 130 is fitted with case 135. The weight of electronic device 130 has overcome the force in tension spring 220 allowing linkage 210 to translate to the right and rotate about pivot 230. Further, first end 215 of linkage 210 has traveled downward along track 240 into well 305 until the bottom of case 135 rests against exterior surface 110 of housing 105. Thus, the bottom surface of case 135 acts as a travel stop so gap 255 between electronic device 130 and dock 100 may be reduced or completely eliminated, resulting in improved aesthetics. Because actuator 200 employs the bottom of electronic device 125 (or the bottom of case 135 if so equipped) as a travel stop, gap 255 will be eliminated regardless of whether or not case 135 is used and, within certain limits, regardless of the thickness of the case. Protrusion length 315 of plug connector 120 is greater than protrusion length 310 in FIG. 3 because of the added thickness of case 135. In further embodiments, electronic device 125, 130 may be tilted relative to exterior surface 110 of housing 105 making display 145, 145a more readable and accessible.

To undock electronic device 125, 130, a user may apply an upward force to the electronic device which will cause first end 215 of linkage 210 to travel out of well 305 and up to ledge 245, as illustrated in FIG. 2. Once receptacle connector 160, 160a of electronic device 125, 130 is demated, tension spring 220 retains actuator 200 in the unmated position illustrated in FIG. 2. Thus, actuator 200 with tension spring 220 is configured to retain connector plug 120 in the first position (i.e., as illustrated in FIG. 2) before a mating event and allow the connector plug to move to the second position (i.e., as illustrated in FIG. 4) after a mating event.

In some embodiments aperture 205 may have one or more tapers 206 as illustrated in FIGS. 2-4 to minimize the size of the opening on exterior surface 110 and to provide an adequate range of motion for plug connector 120. Tapered aperture 205 may also result in improved aesthetics by having minimal clearance between exterior surface 110 of housing 105 and connector plug 120. Other aperture 205 shapes may be used including rectangular, radiused and curved edges. In some embodiments a flexible insert may be employed such as an elastomeric grommet disposed within aperture 205 and around plug connector 120.

In some embodiments plug connector 120 may be an eight contact axisymmetric dual orientation plug connector. One embodiment may employ a connector as described in U.S. Pat. No. 8,708,745 which is incorporated herein in its entirety for all purposes. Plug connector 120 may include a connector tab 405 that extends from linkage 210. Connector tab 405 may include a first mating surface and in some embodiments may include a second mating surface (not shown). A plurality of electrical contacts 165(1) . . . 165(8) (see FIG. 1) may be disposed at the first and second mating surfaces. In some embodiments, electrical contacts 165(1) . . . 165(8) may be disposed on only one mating surface, particularly in embodiments employed in docking stations as the electronic device is always mated in the same orientation. Other embodiments may employ different plugs such as a 30-pin connector or USB type connector.

Although electronic devices 125, 130 (see FIG. 1) are described and illustrated as one particular electronic device, embodiments of the invention are suitable for use with a multiplicity of electronic devices that are matable with a docking station. For example, any device that receives or transmits audio, video or data signals may be used with the invention. In some instances, embodiments of the invention are particularly well suited for use with portable electronic media devices because of their potentially small form factor and their use with docking stations. As used herein, an electronic media device includes any device with at least one electronic component that may be used to present human-perceivable media. Such devices may include, for example, portable music players (e.g., MP3 devices and Apple's iPod devices), portable video players (e.g., portable DVD players), cellular telephones (e.g., smart telephones such as Apple's iPhone devices), video cameras, digital still cameras, projection systems (e.g., holographic projection systems), gaming systems, PDAs, as well as tablet (e.g., Apple's iPad devices), laptop or other mobile computers. Some of these devices may be configured to provide audio, video or other data or sensory output.

Figure 5:
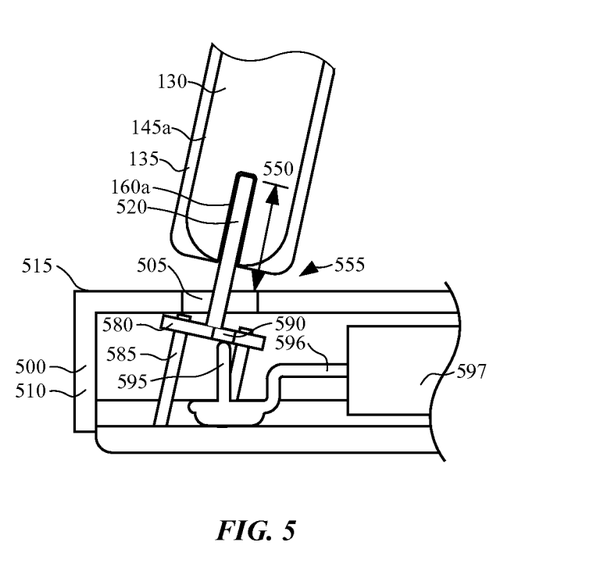
FIG. 5 is a partial cross-sectional view of another embodiment of a docking station with an electronic device being mated to it.

Now referring to FIG. 5, another embodiment of a docking station 500 that may be used to improve the aesthetics and/or usability of an electronic device 130 mated with it is illustrated. Docking station 500 employs a different mechanism than docking station 100 (see FIGS. 2-4), however it also accommodates electronic devices without cases as well as those with cases while providing an aesthetically pleasing appearance. FIG. 5 is a simplified partial cross-sectional view of receptacle connector 160a of electronic device 130 with case 135 being mated to plug connector 520 of docking station 500. Plug connector 520 protrudes through aperture 505 disposed in docking station 500. Plug connector 520 is secured to translatable plate 580 disposed within housing 510 of docking station. Translatable plate 580 slides vertically along one or more guides 585 and is configured to allow connector plug 520 to move along a substantially rectilinear path. Translatable plate 580 has a tab 590 resting on a support 595 which is connected to a plunger 596 of a solenoid 597. In this configuration plug connector 520 is supported in an extended position having a first protrusion length 550 above exterior surface 515 of housing 510. Electronic device 130 may be mated to docking station 500 by mating receptacle connector 160a of electronic device 130 with plug connector 520 of the docking station. Gap 555 between electronic device 130 case 135 and exterior surface 515 of housing 510 may be aesthetically undesirable.

Figure 6:
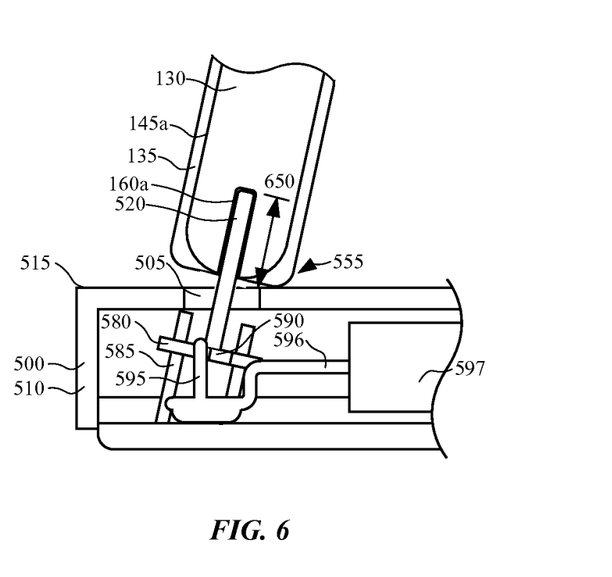
FIG. 6 is a partial cross-sectional view of the docking station shown in FIG. 5 after the electronic device is mated.

In this embodiment the mating event may be electrically detected by electronic device 130 and/or docking station 500 and solenoid 597 may be commanded to extend plunger 596. FIG. 6 illustrates plunger 596 in an extended position such that tab 590 of translatable plate 580 no longer rests on support 595. The weight of electronic device 130 causes translatable plate 590 to travel downward along guides 585 until the bottom surface of case 135 of electronic device 130 rests on exterior surface 515 of housing 510. Gap 555 between case 135 and dock 500 may be reduced or completely eliminated, resulting in improved aesthetics. As illustrated above, because the bottom surface of the case is used as a travel stop, gap 555 will be eliminated regardless of whether or not case 135 is used and, within certain limits, regardless of the thickness of the case. Further, in some embodiments, electronic device 130 may be tilted relative to exterior surface 515 of housing 510 making display 145 more readable and accessible. In other embodiments electronic device 130 may not be tilted and may be substantially perpendicular to exterior surface 515 of housing 510.

FIG. 6 further illustrates plug connector 520 refracted within housing 510 such that the plug connector protrudes a second protrusion length 650 from exterior surface 515 of housing 510, wherein the second protrusion length is less than first protrusion length 550. During a demating event, a user may apply a vertical force to electronic device 130 pulling receptacle connector 160a and translatable plate 580 upwards along guides 585. The demating event may be electrically detected by electronic device 130 and/or docking station 500 and solenoid 597 may be commanded to retract plunger 596. Receptacle connector 160a may be fully demated from plug connector 520 and tab 590 of translatable plate 580 may again rest on support 595.

Figure 7:
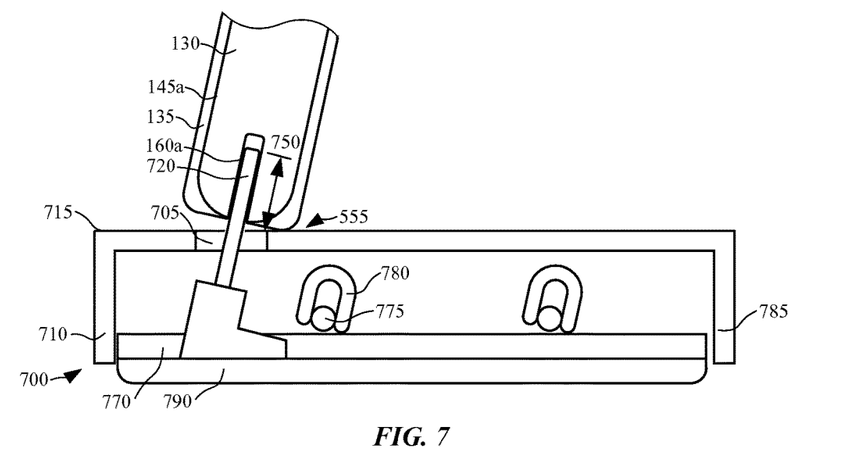
FIG. 7 is a partial cross-sectional view of another embodiment of a docking station with an electronic device being mated to it.
Figure 8:
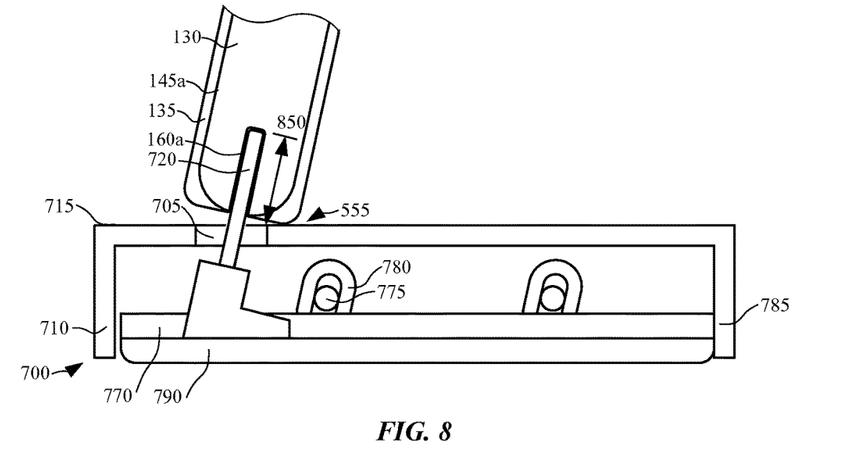
FIG. 8 is a partial cross-sectional view of the docking station shown in FIG. 7 after the electronic device is mated.

Now referring to FIG. 7, another embodiment of a docking station 700 that may be used to improve the aesthetics and/or usability of electronic device 130 mated with the dock is illustrated. FIG. 7 is a simplified partial cross-sectional view of receptacle connector 160a of electronic device 130 with case 135 in the process of being mated to plug connector 720 of docking station 700. Plug connector 720 protrudes through aperture 705 disposed in housing 710 of docking station 700. Plug connector 720 is secured to inner base 770 of housing 710 of docking station 700. Inner base 770 has one or more pins 775 disposed in guides 780 coupled to outer housing 785 that allow the outer housing to vertically translate relative to inner base 770 (i.e., pins 775 slide in guides 780). In some embodiments, as illustrated in FIGS. 7 and 8, guides 780 may be oriented at an angle such that outer housing 785 translates both vertically and horizontally relative to inner base 770. The horizontal movement may be beneficial when aperture 705 is relatively small and connector plug 720 is mounted on an angle, as illustrated in FIGS. 7 and 8. The angular movement of outer housing 785 may then allow aperture 705 to follow the angle of plug connector 720 when it moves relative to inner base 770. In some embodiments outer housing 785 may be supported above inner base 770 by one or more compression springs (not shown) or other feature. FIG. 7 shows plug connector 720 in a retracted position having a first protrusion length 750 above an exterior surface 715 of housing 710.

Now referring to FIG. 8, electronic device 130 is illustrated fully mated to docking station 700 (i.e., receptacle connector 160a of electronic device 130 is fully mated with plug connector 720 of docking station 700). Outer housing 785 has been forced by case 135 to translate downward toward inner base 770. Connector plug 720 now has a second protrusion length 850 that is greater than first protrusion length 750 (see FIG. 7) such that receptacle connector 160a and plug connector 720 are fully mated. Because the bottom surface of case 135 is used to move outer housing 785, there will be no gap between the case and the outer housing regardless of whether or not case 135 is used and, within certain limits, regardless of the thickness of the case. Further, electronic device 130 may be tilted relative to exterior surface 715 of housing 710, making display 145a more readable and accessible. In some embodiments inner base may have an elastomeric pad 790 adhered to it.

In some embodiments, when electronic device 130 is demated from connector plug 720, outer housing 785 is forced by one or more compression springs (not shown) or other feature upward away from inner base 770 to the position illustrated in FIG. 7.

In other embodiments outer housing 785 may be temporarily latched in a depressed position by a mechanism configured to secure the outer housing's 785 vertical position relative to inner base 770. More specifically, outer housing 785 may be vertically depressed towards inner base 770 and latched into a depressed position such that when electronic device 130 is demated, the outer housing remains in the depressed position and does not vertically translate upward. Because the bottom surface of case 135 is used to depress outer housing 785 to a position where it is secured, there will be no gap between the device and the housing for that particular electronic device configuration without having to depress outer housing 785 every mate cycle.

Myriad latch mechanisms may be employed including, but not limited to, the following. In one embodiment the latch mechanism may employ a ratcheting catch (not shown) that is released when a magnet is placed proximate outer housing 785. A ratchet is a mechanical device that allows linear motion in only one direction (i.e., outer housing 785 translating towards inner base 770) while preventing motion in the opposite direction (i.e., the outer housing translating away from inner base 770). A ratchet may allow outer housing 785 to be temporarily secured in a wide range of positions relative to inner base 770 such that myriad combinations of electronic devices with and without cases may be used. In another embodiment the temporary latch mechanism may be released by depressing outer housing 785 a greater distance towards inner base 770, similar to the way some residential cabinet latches operate. In further embodiments, the temporary latch mechanism may be released by the pressing a button, lever or other actuator on docking station 700.

Figure 9:
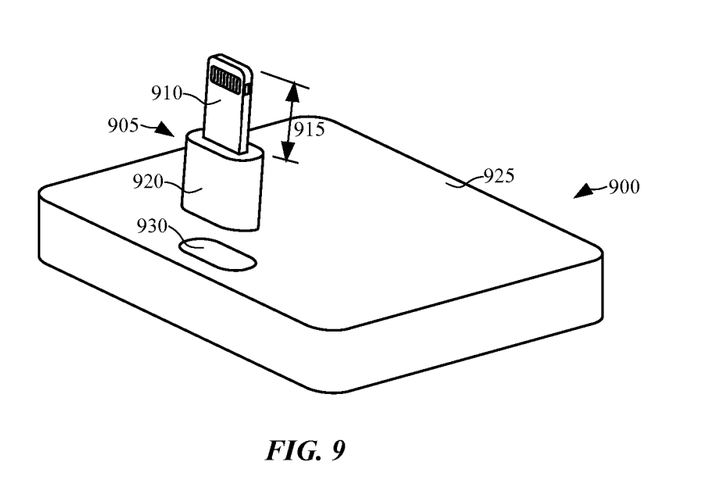
FIG. 9 is a front perspective view of another embodiment of a docking station having different connector inserts.

Now referring to FIG. 9, another embodiment of a docking station 900 that may be used to improve the aesthetics and/or usability of a mated electronic device is illustrated. Docking station 900 may be configured to receive connector insert 905 in aperture 930. Connector insert 905 may have a connector base 920 electrically and physically coupled to a connector plug 910 that is configured to interface with a receptacle connector in an electronic device. Connector base 920 may have an interface connector, discussed below, such as Apple's MagSafe, pin and socket, blade, USB or other type that interfaces with a corresponding connector (not shown) in aperture 930 of docking station 900. Plug connector 910 may extend from connector base 920 of connector insert 905 and may be configured to have different protrusion lengths 915 from exterior surface 925 of docking station 900. The appropriate protrusion length 915 of plug connector 910 may be chosen by a user such that when an electronic device is mated with docking station 900, no gap exists between the electronic device and dock 900, as discussed above.

Figure 10:
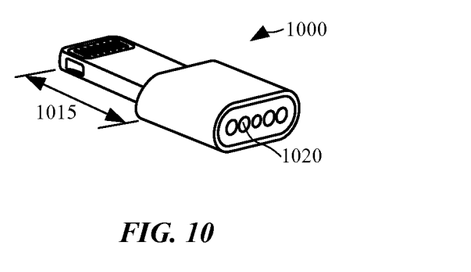
FIGS. 10 and 11 are perspective views of different connector inserts for the docking station shown in FIG. 9.
Figure 11:
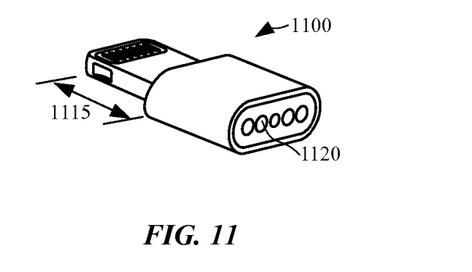

The elimination and/or minimization of such a gap may result in improved aesthetics. Further, docking station 900 and connector insert 905 may be configured to tilt the electronic device relative to exterior surface 925, making the device display more readable and accessible. FIG. 10 illustrates a connector insert 1000 having a first protrusion length 1015 and FIG. 11 illustrates a connector insert 1100 having a second protrusion length 1115 where the first protrusion length is greater than the second protrusion length. Connector insert 1000 has an interface connector 1020, providing an electrical interface to docking station 900. Connector insert 1100 also has an interface connector 1120, providing an electrical interface to docking station 900.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A docking station for a portable electronic device, the docking station comprising:
   a housing having an exterior surface;
   a connector plug protruding from the exterior surface and configured to mate with the portable electronic device, the connector plug configured to retract within the housing after a mating event such that a distal end of the connector plug protrudes a first distance beyond the exterior surface after the mating event and protrudes a second distance, greater than the first distance, beyond the exterior surface before the mating event; and
   a linkage securing the connector plug to the housing and having a first position before the mating event where a first end of the linkage is supported by a ledge such that the portable electronic device can be mated with the connector plug and a second position after the mating event where the first end of the linkage is moved off the ledge into a depression such that the portable electronic device contacts the exterior surface of the docking station.

2. The docking station of claim 1 wherein the linkage is a component of an actuator disposed within the housing and coupled to the connector plug.

3. The docking station of claim 2 wherein the actuator is configured to retain the connector plug in the first position before the mating event and allow the connector plug to move to the second position after the mating event.

4. The docking station of claim 2 wherein the actuator is configured to retract and tilt the connector plug relative to the housing.

5. The docking station of claim 2 wherein the actuator includes a tension spring that resists retraction of the connector plug within the housing and is configured to return the connector plug to an unmated position after the electronic device is demated from the connector plug.

6. The docking station of claim 1 wherein the linkage includes a pivot on a first end and a tension spring attached to a second end.

7. The docking station of claim 6 wherein the pivot is configured to translate and rotate.

8. A docking station for a portable electronic device, the docking station comprising:
- a housing having an exterior surface;
- a connector plug protruding from the exterior surface; and
- an actuator coupled to the connector plug and adapted to position the connector plug in a first position in which a distal end of the connector plug protrudes a first distance beyond the exterior surface before the portable electronic device is mated with the connector plug, and a second position in which the distal end of the connector plug protrudes a second distance beyond the exterior surface after the portable electronic device is mated with the connector plug wherein the first distance is greater than the second distance;
- wherein the actuator includes a linkage securing the connector plug to the housing, wherein when the connector plug is in the first position a first end of the linkage is supported by a ledge and when the connector plug is in the second position the first end of the linkage is moved off of the ledge and into a depression.

9. The docking station of claim 8 wherein the actuator is configured to retain the connector plug in the first position before a mating event and allow the connector plug to move to the second position after a mating event.

10. The docking station of claim 8 wherein the actuator is configured to position the connector plug approximately perpendicular to the exterior surface in the first position and tilt the connector plug relative to the exterior surface in the second position.

11. The docking station of claim 8 wherein the actuator is configured to retract and tilt the connector plug relative to the housing.

12. The docking station of claim 8 wherein the actuator includes a tension spring that resists retraction of the connector plug within the housing and is configured to return the connector plug to an unmated position after the electronic device is demated from the connector plug.

13. The docking station of claim 8 wherein the linkage has a pivot on a second end and a tension spring attached to the first end.

14. The docking station of claim 13 wherein the pivot is configured to allow the linkage to translate and rotate.

* * * * *